United States Patent
Gumbrecht

(10) Patent No.: US 12,553,962 B2
(45) Date of Patent: Feb. 17, 2026

(54) METHOD FOR ASCERTAINING AN ITEM OF LOCAL SPECIFIC ABSORPTION RATE INFORMATION AND FOR ASCERTAINING A MEASURING PULSE GROUP OF RADIO FREQUENCY PULSES, MAGNETIC RESONANCE FACILITY, COMPUTER PROGRAM, AND ELECTRONICALLY READABLE DATA CARRIER

(71) Applicant: Siemens Healthineers AG, Forchheim (DE)

(72) Inventor: Rene Gumbrecht, Bamberg (DE)

(73) Assignee: Siemens Healthineers AG, Forchheim (DE)

( * ) Notice: Subject to any disclaimer, the term of this patent is extended or adjusted under 35 U.S.C. 154(b) by 128 days.

(21) Appl. No.: 18/608,318

(22) Filed: Mar. 18, 2024

(65) Prior Publication Data
US 2024/0319295 A1 Sep. 26, 2024

(30) Foreign Application Priority Data
Mar. 20, 2023 (DE) .......................... 102023202430.6

(51) Int. Cl.
*G01R 33/28* (2006.01)
(52) U.S. Cl.
CPC .................................. *G01R 33/288* (2013.01)
(58) Field of Classification Search
None
See application file for complete search history.

(56) References Cited

U.S. PATENT DOCUMENTS

| 8,890,524 B2 * | 11/2014 | Boernert | G01R 33/5659 324/309 |
| 9,316,710 B2 * | 4/2016 | Graesslin | G01R 33/3415 |
| (Continued) | | | |

FOREIGN PATENT DOCUMENTS

| CN | 102007423 A | 4/2011 |
| CN | 102695963 A | 9/2012 |
| (Continued) | | |

OTHER PUBLICATIONS

Eichfelder G. et al., "Local Specific Absorption Rate Control for Parallel Transmission by Virtual Observation Points," Magnetic Resonance in Medicine 66 (2011), pp. 1468-1476.
(Continued)

*Primary Examiner* — Rodney E Fuller
(74) *Attorney, Agent, or Firm* — Lempia Summerfield Katz LLC

(57) ABSTRACT

A method is provided for ascertaining an item of local specific absorption rate (SAR) information in an object under effect of specified radio frequency pulses of a candidate group output with a radio frequency coil arrangement of a magnetic resonance facility, wherein the radio frequency pulses are embodied for manipulating nuclear spins of at least two different nuclides. The method includes implementing a parallel transmission technique for at least one nuclide; generating actuation variables assigned in accordance with the candidate group due to the actuation of the radio frequency coil arrangement; and ascertaining the item of local SAR information by an ascertainment algorithm using the actuation variables as the input data. The ascertainment algorithm is parameterized by taking into account the nuclides and respectively assigned logical coil channels thereof such that the item of local SAR information is jointly
(Continued)

ascertained for all nuclides with the same local location reference.

15 Claims, 3 Drawing Sheets

(56) References Cited

U.S. PATENT DOCUMENTS

| | | |
|---|---|---|
| 2010/0134105 A1 | 6/2010 | Zelinski |
| 2011/0043205 A1 | 2/2011 | Graesslin |
| 2012/0256626 A1 | 10/2012 | Adalsteinsson et al. |
| 2012/0262174 A1 | 10/2012 | Voigt |
| 2013/0257427 A1 | 10/2013 | Fautz |
| 2014/0132262 A1 | 5/2014 | Fautz |
| 2015/0002147 A1 | 1/2015 | Fontius et al. |
| 2015/0123660 A1 | 5/2015 | Vaughan, Jr. |
| 2015/0219738 A1 | 8/2015 | Chen |
| 2017/0123022 A1 | 5/2017 | Guerin |
| 2019/0086499 A1 | 3/2019 | Ohishi |

FOREIGN PATENT DOCUMENTS

| | | | |
|---|---|---|---|
| CN | 102736045 A | 10/2012 | |
| CN | 106137200 A | * 11/2016 | ............ G01R 33/54 |
| DE | 102012205297 A1 | 10/2013 | |
| DE | 102012220462 A1 | 6/2014 | |

OTHER PUBLICATIONS

Lee J. et al., "Local SAR in Parallel Transmission Pulse Design," Magnetic Resonance in Medicine; vol. 67; 2012; pp. 1566-1578.

Orzoda S. et al., "Local SAR compression algorithm with improved compression, speed, and flexibility," Magnetic Resonance in Medicine 86 (2021), pp. 561-568.

Wang C. et al., "A Practical Multinuclear Transceiver Volume Coil for in-vivo MRI/MRS at 7T," Magnetic Resonance Imaging 20 (2012), pp. 78-84.

* cited by examiner

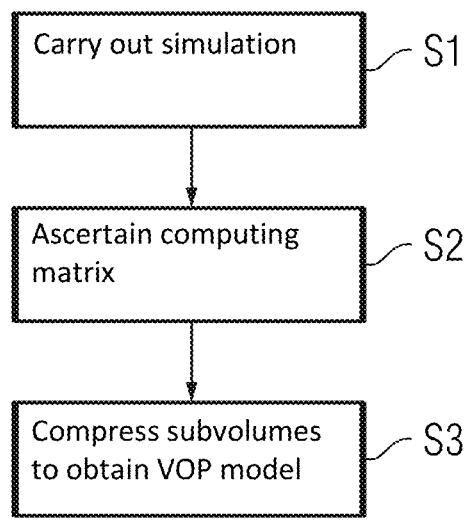
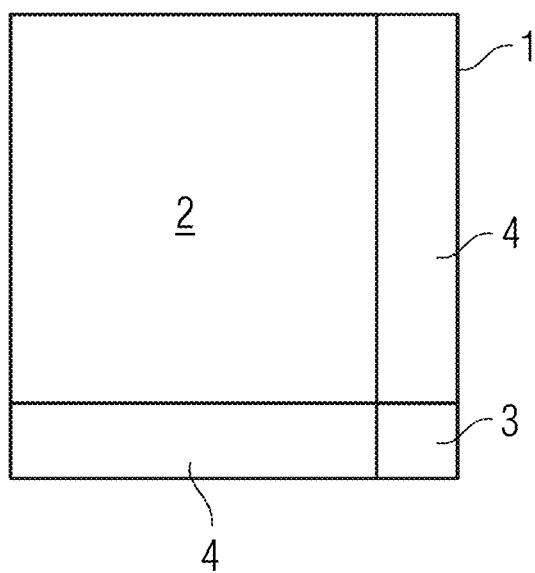

METHOD FOR ASCERTAINING AN ITEM OF LOCAL SPECIFIC ABSORPTION RATE INFORMATION AND FOR ASCERTAINING A MEASURING PULSE GROUP OF RADIO FREQUENCY PULSES, MAGNETIC RESONANCE FACILITY, COMPUTER PROGRAM, AND ELECTRONICALLY READABLE DATA CARRIER

The present patent document claims the benefit of German Patent Application No. 10 2023 202 430.6, filed Mar. 20, 2023, which is hereby incorporated by reference in its entirety.

TECHNICAL FIELD

The disclosure relates to a method for ascertaining an item of local specific absorption rate information in an object under the effect of specified radio frequency pulses of a candidate group, which are output with a radio frequency coil arrangement of a magnetic resonance facility, wherein the radio frequency pulses are configured to manipulate the nuclear spins of at least two different nuclides, implement a parallel transmission technique for at least one of the nuclides, and due to the actuation of the radio frequency coil arrangement, actuation variables assigned in accordance with the candidate group are generated, wherein the item of local specific absorption rate information is ascertained by an ascertainment algorithm which uses the actuation variables as the input data.

In addition, the disclosure relates to a method for ascertaining a measuring pulse group of radio frequency pulses for use in a magnetic resonance measurement with a magnetic resonance facility, to a magnetic resonance facility, a computer program and an electronically readable data carrier.

BACKGROUND

Magnetic resonance imaging is a now-established medical imaging modality. An important issue in magnetic resonance imaging with imaging magnetic resonance facilities is patient safety, in particular with regard to an input of energy due to radio frequency pulses used during magnetic resonance sequences. This energy input, in particular as heat, into the patient as the object is described by the specific absorption rate (SAR).

Possibilities for monitoring the SAR as well as for pre-calculating a SAR, for example, with respect to the pulse design, exist in modern magnetic resonance facilities. In some cases, it may be sufficient to monitor the global SAR, with cases also existing, however, in which the local SAR is relevant.

Such cases may include the use of parallel transmission techniques as well as the measurement of magnetic resonance signals of a plurality of nuclides. In parallel transmission techniques (pTx), radio frequency coil arrangements with a plurality of trace elements are used, which may be actuated independently via different physical coil channels. Overlaying electromagnetic fields of a plurality of coil elements may result in local hotspots. On the other hand, parallel transmission techniques provide additional degrees of freedom which make it possible to prevent such hotspots and distribute the energy input.

In multi-nuclide recording techniques, radio frequency signals are used for manipulating nuclear spins of different nuclides, which use different frequencies, therefore. A manipulation of nuclear spins, which are oriented in a main magnetic field (B0 field) of the imaging magnetic resonance facility, may include an excitation of nuclear spins as the basis for a magnetic resonance measurement, but also a refocusing, an inversion, and the like. Here too there is the risk of the overlaying of resulting fields, which may result in hotspots. Different nuclides, for which joint imaging may occur, include, for example, protons (1H), fluorine (19F), and sodium (23Na). A purely exemplary volume coil suitable for a plurality of nuclides is described in an article by Chunsheng Wang et al., "A Practical Multinuclear Transceiver Volume Coil for in-vivo MRI/MRS at 7T," Magnetic Resonance Imaging 20 (2012), pages 78 to 84. In general, multi-nuclide imaging may be carried out at high magnetic field strengths, in particular at seven tesla or more.

In particular, a combination of parallel transmission techniques for at least one of the nuclides and multi-nuclide imaging results in complex tasks with respect to patient safety. In particular, a complex heating pattern results in the object, the relevant volume of the patient therefore, due to the use of a radio frequency coil arrangement with at least two supported nuclides, which is pTx-capable for at least one of the nuclides. Current approaches are based on an optimally independent consideration of the SAR for different nuclides. The hotspot is determined for each nuclide, with the corresponding values for the SAR being added up, and, more precisely, independently of the location where the energy is input. Patient safety is provided with this conservative approach, but it is not possible to achieve optimum image recording performance.

For parallel transmission techniques, a volume of the object being considered may be separated into subvolumes. In the context of medical imaging, these subvolumes may be defined such that a particular mass, for example, 10 g, is contained therein. Simulations may now be carried out for these subvolumes in order to ascertain electrical fields which result in response to standard actuations (standard conditions) in the subvolumes. By way of example, the simulated electrical fields may be standardized to 20 milliwatts forward power in the corresponding physical coil channels. Reference is made in this case to the coil connector. In addition to the coil arrangement and the object, at least the volume, the simulated model may also take into account further features of the surroundings.

While it would accordingly basically be conceivable, using the specific actuation variables for a candidate group to be examined with respect to the SAR, to ascertain an item of local specific absorption rate information for each subvolume by a suitable correlation, in practice this is rarely expedient, however, in particular with, for example, up to seven-digit numbers of subvolumes. Compression methods have therefore been proposed that reduce the number of locations to be considered.

A known and frequently used category of such compression methods are those which use virtual observation points (VOP). By way of example, it may be provided in this connection that regions with similar SAR behavior, which may be represented by a single virtual observation point, are gathered together by way of abstract clusters. This is motivated by the empirical observation that simulated local SAR hotspots may frequently only be found at a few points in the body. The idea of virtual observation points was introduced in an article by Gabriele Eichfelder and Matthias Gebhardt, "Local Specific Absorption Rate Control for Parallel Transmission by Virtual Observation Points," Magnetic Resonance in Medicine 66 (2011), pages 1468-1476. Improvements may be found, for example, in the articles by Joonsung Lee et al., "Local SAR in Parallel Transmission Pulse Design," Magnetic Resonance in Medicine 67 (2012), pages 1566-1578, and by Stephan Orzoda et al., "Local SAR compression algorithm with improved compression, speed, and flexibility," Magnetic Resonance in Medicine 86 (2021), pages 561-568.

One problem with this is that while local SAR values may be determined for a plurality of virtual observation points, owing to the abstract clustering the reference to the actual location is lost. In particular, VOP results for different nuclides relate to different virtual observation points whose spatial correlation is not known. For nuclides using just one coil channel, not pTx-capable therefore, SAR values may be ascertained by multiplying the actuation variable by a factor, what is known as the k-value, so a local reference is no longer provided here. This results in simple additions of the respective results and therefore in a very conservative estimate, which makes the scope for use and design for radio frequency pulses unattainable.

SUMMARY AND DESCRIPTION

The disclosure is therefore based on the object of disclosing a possibility for improving the performance of magnetic resonance facilities with regard to SAR limitations.

This object is achieved by the methods, the magnetic resonance facility, the computer program, and the electronically readable data carrier as disclosed herein.

The scope of the present disclosure is defined solely by the appended claims and is not affected to any degree by the statements within this summary. The present embodiments may obviate one or more of the drawbacks or limitations in the related art.

In a method of the type mentioned in the introduction, the ascertainment algorithm is parameterized by taking into account the nuclides and their respectively assigned logical coil channels in such a way that the item of local specific absorption rate information is jointly ascertained for all nuclides with the same local location reference.

The candidate group is provided for a measurement with the magnetic resonance facility and may be evaluated with respect to the local specific absorption rate, for example with regard to demands on the SAR. This evaluation may take place, in particular, according to the selection and/or setting of the candidate group by a user and/or in the context of a pulse design. The present disclosure is also directed at a corresponding method for ascertaining a measuring pulse group of radio frequency pulses for use in a magnetic resonance measurement with a magnetic resonance facility, a pulse design method, therefore. A manipulation of nuclear spins, which are oriented in a main magnetic field (B0 field) of the imaging magnetic resonance facility, may include an excitation of nuclear spins as the basis for a magnetic resonance measurement, but also a refocusing, an inversion and the like.

It has been recognized that the item of location information for the local specific absorption rate is needed for optimum utilization of the scope for performance for the radio frequency pulses. Only then is it namely possible to evaluate hotspots of different nuclides to determine whether they coincide or not. If the hotspots are spatially separated, the local specific absorption rate does not fully add up and it is potentially possible to still adhere to limit values, despite the fact that they would not be adhered to with a conservative consideration, which would have added up the maximum values of the local specific absorption rate.

It is therefore being proposed that the ascertainment algorithm is configured such that the item of local specific absorption rate information, and therewith, the hotspots, is/are jointly ascertained for all nuclides and thus it is possible to already take into account internally whether hotspots coincide or not. This is independent of whether the item of location information is retained in the item of local specific absorption rate information or not.

The limitation of the performance or of the d design scope for the magnetic resonance facility is much reduced in this way in that, as a result of the joint consideration, location information is incorporated in the evaluation of the local specific absorption rate for all nuclides.

In this connection, a joint ascertainment of this kind may be implemented for common approaches when evaluating candidate groups with respect to the local specific absorption rate. Many ascertainment algorithms thus use simulation results, which they link via a computing matrix, containing the simulation results, to the actuation variables to be able to determine the local specific absorption rate. In this connection, it may be provided that for parameterization of the ascertainment algorithm: for all logical coil channels used for outputting the radio frequency pulses, to which channels one actuation variable is assigned respectively, a simulation for ascertaining items of field information, which describe the generated electrical field for each of a plurality of subvolumes of the object is carried out under standard conditions defined in respect of the actuation variables; and for each subvolume, a computing matrix of the ascertainment algorithm is ascertained from the items of field information, which matrix connects the actuation variables to the local specific absorption rate and is dimensioned to cover all logical coil channels, wherein matrix elements, which link logical coil channels assigned to different nuclides, are set at zero.

Logical coil channels are considered here because embodiments are necessarily known in which a physical coil channel, a connection of the radio frequency coil arrangement at the coil connector, therefore, may be used for a plurality of nuclides. By way of example, the associated coil elements of the radio frequency coil arrangement may be suitably detunable or even set to a plurality of frequencies (for example, "dual-tuned"). Even if this has not been necessary in methods known to date, for example, for nuclides in which a parallel transmission technique was not possible, the present disclosure provides that the simulation is carried out for all logical coil channels, so the corresponding field information is comprehensively present and may be taken into account accordingly.

The comprehensively ascertained field information, which is therefore present for all logical coil channels, is incorporated as a whole in the computing matrix, which is accordingly also dimensioned for use with actuation variables for all logical coil channels. If the actuation variables are in the form of a vector, for example, the vector has the dimension of all logical coil channels, while the computing matrix is a square matrix with the same dimension. A computing matrix of this kind is also frequently referred to as a "Q-matrix." If, in one example, eight logical coil channels exist for one nuclide and one logical coil channel for a further nuclide, the computing matrix is determined as a 9×9 matrix.

The enlargement of the computing matrix described here does not bring about a massive complication because logical coil channels, which are assigned to different nuclides, linking entries may be set to zero. Different magnetic resonance frequencies are assigned to the different nuclides in the same main magnetic field, so, figuratively speaking, different peaks exits with a Fourier transform. It may be seen from this already that the scalar product of wave forms without shared frequencies is zero.

To generally reduce the computing effort, it is expedient if the ascertainment algorithm includes a compression method in which clusters, which include a plurality of subvolumes, are jointly represented, in particular by one of the subvolumes. Specifically, in certain examples, a compression method that uses virtual observation points may be used as the compression method. Compression methods of this kind are frequently also referred to as VOP methods. VOP methods conventionally use computing matrices, as have previously been described. Because these computing matrices are established for all logical coil channels, and thus all nuclides, the results obtained in the VOP method also relate to all of these nuclides or, in other words, the virtual observation points on the same cluster. This means the ascertainment algorithm internally automatically takes into account the position of hotspots of the different radio frequency pulses for different nuclides. With a simple expansion of such VOP methods to a plurality of nuclides, it being possible for matrix entries of the computing matrix that link different nuclides to be kept at zero, overall results are produced which take into account location relationships and are thus far superior to previously undertaken separate considerations and summations. In addition, it is irrelevant whether ascertained virtual observation points may be assigned to specific locations in the object or not because the virtual observation points relate to all nuclides. The drawback of the loss of information is thus eliminated with the procedure.

For the avoidance of doubt, the logical coil channels are simulated for all nuclides with the same model for the object, in particular at least part of a patient, and for the radio frequency coil arrangement, and optionally further features of the surroundings. The result is, for example, field maps for the standard conditions or items of information on interactions (occurring inside the nuclide only) and outputs (diagonals of the computing matrix). When a VOP method is used, a VOP model applicable to all nuclides is then ascertained by way of the ascertainment algorithm on the basis of the shared computing matrix and all of the actuation variables, which model describes the local specific absorption rate as the item of local specific absorption information.

As already mentioned, it is also conceivable that only one logical coil channel is used for at least one of the nuclides. In particular, in the case of pulse design methods, as is demonstrated below, the procedure then enables an adjustment of unchangeable hotspots for this at least one nuclide, in that for nuclides whose radio frequency pulses use the parallel transmission technique, the changeable hotspots thereof are shifted, as it were. It is also conceivable, as already mentioned, that logical coil channels used for different nuclides use a shared physical coil channel.

The disclosure also relates to a method for ascertaining a measuring pulse group of radio frequency pulses for use in a magnetic resonance measurement with a magnetic resonance facility, wherein the measuring pulse group for adhering to a boundary condition, which limits the local specific absorption rate, and/or for minimizing the maximum local specific absorption rate that occurs is ascertained in an optimization procedure, and wherein the boundary condition is adhered to and/or minimization takes place by using an item of local specific absorption rate information, which is ascertained for candidate groups of radio frequency pulses, which are evaluated in the optimization procedure, with a method as claimed in one of the preceding claims.

For such pulse design methods, which are known in the prior art and do not have to be explained in detail here, the procedure may be employed particularly advantageously therefore for evaluating the local specific absorption rate. Further boundary conditions and/or optimization criteria in such methods may be directed, for example, to technical properties of components of the magnetic resonance facility, an optimally homogeneous and/or purposeful manipulation and/or a minimization of electromagnetic disturbances and/or eddy currents that occur.

The joint consideration of all nuclides using a joint location reference allows greater scope to be used in pulse design. If it were still conceivable, for example, when using a boundary condition which may indicate, for example, a maximum admissible local specific absorption rate, with separate consideration and simpler summation, that the boundary condition would be infringed despite the limit values not being overshot in practice, the procedure takes into account the relative position of hotspots and reliably identifies potential instances of the limit value being overshot. These advantages occur accordingly even if a minimization is sought. By using a shared location reference, adjustable hotspots of different nuclides may be coordinated with each other in order to prevent limit value infringements and allow an optimally uniformly distributed local specific absorption rate. This will be particularly apparent for cases in which unchangeable hotspots occur owing to the assignment of just one single logical coil channel to one nuclide.

Thus, according to a development of the pulse design method, during the course of the optimization procedure when a hotspot exists for at least one first nuclide to which only one logical coil channel is assigned, at least one hotspot of at least one second one of the nuclides, to which a plurality of logical coil channels is assigned for implementing the parallel transmission technique, is removed from the hotspot for the at least one first nuclide. Radio frequency pulses may thus be designed in such a way that the radio frequency pulses for nuclides, which use the parallel transmission technique, purposefully do not heat up regions in which a hotspot exists for a nuclide in which the parallel transmission technique is not used.

This is explained in more detail using an example. If a radio frequency coil arrangement with a 1Tx 23Na transmitter coil element and with 8Tx 1H transmitter coil elements is used, the 23Na transmitter coil generates a heating hotspot at a particular first position, but no heating at other, second positions. Because only a single transmitter coil, and thus only a single coil channel, is provided for 23Na, the heat pattern or responsible SAR pattern cannot be controlled. The parallel transmission technique is used for 1H, however, so the local SAR pattern, and thus the heat pattern, may be influenced. When designing the radio frequency pulses, there is therefore the possibility of configuring the radio frequency pulses for 1H such that the first position does not receive an additional specific absorption rate, or only a minimal one, and instead the specific absorption rate is shifted to the second positions. The smallest possible heating budget is consumed in this way for the 23Na radio frequency pulses due to 1H radio frequency pulses.

As already mentioned, in the case of a minimization of the local energy input into the object, a uniform distribution of the energy input into the subvolumes may be sought, with the use of a plurality of coil channels for at least one of the nuclides again being utilized to adjust the distribution of hotspots for this at least one nuclide. The value of the maximum of the local specific absorption rate advantageously drops with a uniform distribution.

In addition to the evaluation method and the pulse design method, the present disclosure also relates to a magnetic resonance facility in which these methods may be carried out. The statements relating to the methods continue to apply accordingly to the magnetic resonance facility, so the advantages already mentioned may also be obtained therewith.

A magnetic resonance facility has a radio frequency coil arrangement that has a plurality of coil elements actuated via different physical coil channels and is embodied for imaging with manipulation of a plurality of nuclides, and a control facility embodied for carrying out a method as disclosed herein. The control facility may have at least one processor and at least one storage facility. Functional units may be provided by hardware and/or software in order to execute acts of the method.

Specifically, the control facility may have an ascertainment unit for ascertaining the item of local specific absorption rate information by the ascertainment algorithm, which uses the actuation variables as input data. A parameterization unit may also be provided that, for parameterizing the ascertainment algorithm by taking into account the nuclides and the respectively assigned logical coil channels thereof, is embodied in such a way that the item of local specific absorption rate information is jointly ascertained for all nuclides with the same local location reference. The control facility may also have a simulation unit for ascertaining the items of field information, with the parameterization unit then using the items of field information to establish the computing matrix. For implementing the pulse design method, the control facility may also have an optimization unit to carry out the optimization procedure. Basically, known further functional units may also be provided, (e.g., a sequence unit), which controls the recording operation of the magnetic resonance facility. The sequence unit may also be embodied to actuate the radio frequency coil arrangement for outputting the measuring pulse group of radio frequency pulses in order to carry out the magnetic resonance measurement.

A computer program may be loaded directly into a storage facility of a control facility of a magnetic resonance facility and has program code that, on execution of the computer program, prompt the control facility to carry out the acts of a method. The computer program may be stored on an electronically readable, data carrier, which therefore includes items of control information stored thereon, which include at least one computer program and are configured in such a way that when the data carrier is used in a control facility of a magnetic resonance facility, the facility is configured to carry out a method as disclosed herein.

BRIEF DESCRIPTION OF THE DRAWINGS

Further advantages and details of the present disclosure may be found in the embodiments described below and on the basis of the drawings, in which:

FIG. 1 depicts a flowchart of an embodiment of an evaluation method.

FIG. 2 depicts an example of a first structure of a computing matrix.

DETAILED DESCRIPTION

FIG. 1 shows an embodiment of an evaluation method. A candidate group of radio frequency pulses is to be evaluated, in particular before being played out, with respect to the locally input energy in an object, in particular at least part of a patient, the local specific absorption rate, therefore. Because the radio frequency pulses are to be output by a radio frequency coil arrangement of an imaging magnetic resonance facility, they are defined by actuation variables, for example, a voltage curve or performance curve, for the coil channels of the radio frequency coil arrangement. In the present case, different nuclides are to be manipulated, (e.g., excited), by the candidate group. Even if the same physical coil channel may be used for the excitation of a plurality of nuclides, in the present case, the actuation variables for the logical coil channels may still be considered to be able to distinguish between the nuclides with respect to the radio frequency pulses. A plurality of logical coil channels is used for implementing a parallel transmission technique (pTx) for at least one nuclide.

In act S1, a simulation is carried out to ascertain items of field information. The items of field information describe the electrical fields resulting under defined conditions, based on the actuation variables, in different subvolumes of the object, and, more precisely, for all logical coil channels, all nuclides, therefore. A model of the object and a model of the radio frequency coil arrangement may be used for this. In addition, the use of models is also conceivable for features of the surroundings. The subvolumes are defined, by way of example, such that each subvolume contains a mass of at least approximately 10 g.

In act S2, a computing matrix is ascertained for each subvolume from the items of field information, which matrix connects the actuation variables to the local specific absorption rate and is dimensioned to cover all logical coil channels. Matrix elements, which link logical coil channels assigned to different nuclides, are set to zero here. The computing matrix is square and has the size: "number of logical coil channels×number of logical coil channels."

The computing matrix is ultimately composed of partial matrices along the diagonals, with each of these partial matrices being a Q-matrix suitable for a compression method, which uses virtual observation points, if the respective nuclide was to be considered by itself. In other words, the number of partial matrices corresponds to the number of nuclides.

Figure 3:
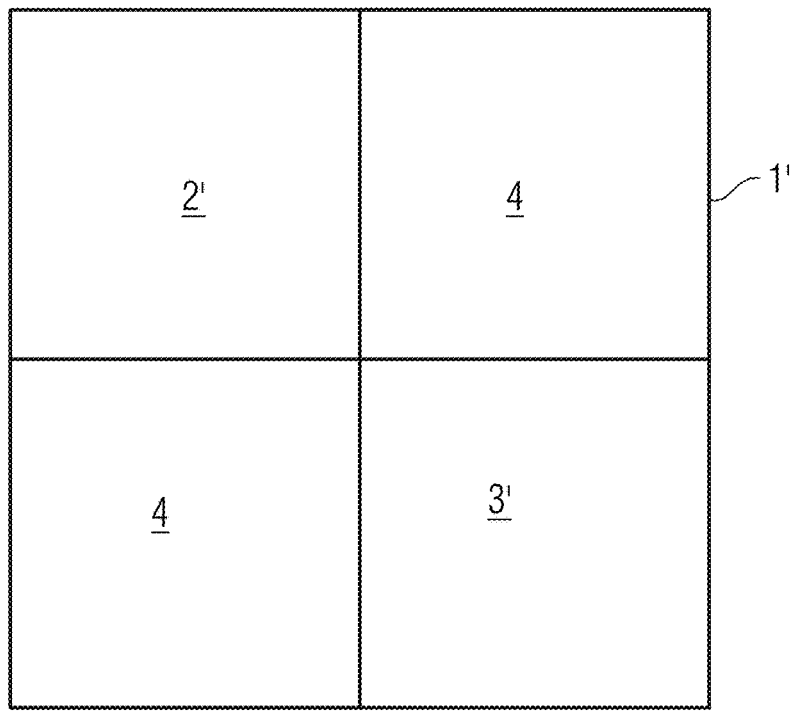
FIG. 3 depicts an example of a second structure of a computing matrix.

This is schematically represented for two examples in FIGS. 2 and 3. FIG. 2 relates to the case where eight logical coil channels are used for protons, 1H therefore, as the nuclide and one logical coil channel for 23Na as the nuclide. This results in a computing matrix 1 which has an overall size of 9×9. The partial matrix 2 for 1H has a size of 8×8, the partial matrix 3 for 23Na a size of 1×1. The regions 4, which would link logical coil channels of different nuclides, contain zeroes.

In the case of FIG. 3, eight logical coil channels are used for 19F, eight further logical coil channels for 1H. This results in a computing matrix 1' with an overall size of 16×16, which includes a first partial matrix 2' for 19F with a size of 8×8 and a second partial matrix 3' for 1H with a size of 8×8. The regions 4 are again filled with zeroes.

The definition of the computing matrix 1, 1' in act S2 corresponds to a parameterization of an ascertainment algorithm, which uses the actuation variables of the candidate group as input data in order to determine an item of local specific absorption rate information. This occurs in act S3, with a compression algorithm, which uses virtual observation points, being used in the present case (VOP algorithm). In other words, the computing matrices 1, 1' containing items of information on all nuclides, compresses a for each subvolume of the object, with the compression algorithm in order to obtain a single VOP model which covers the specific local absorption for all nuclides. This approach may also be applied to any numbers of coil channels and nuclides irrespective of the examples shown.

The parameterization in act S2 therefore ensures that the item of local specific absorption rate information, here the VOP model, is jointly ascertained for all nuclides with the same local location reference.

Figure 4:
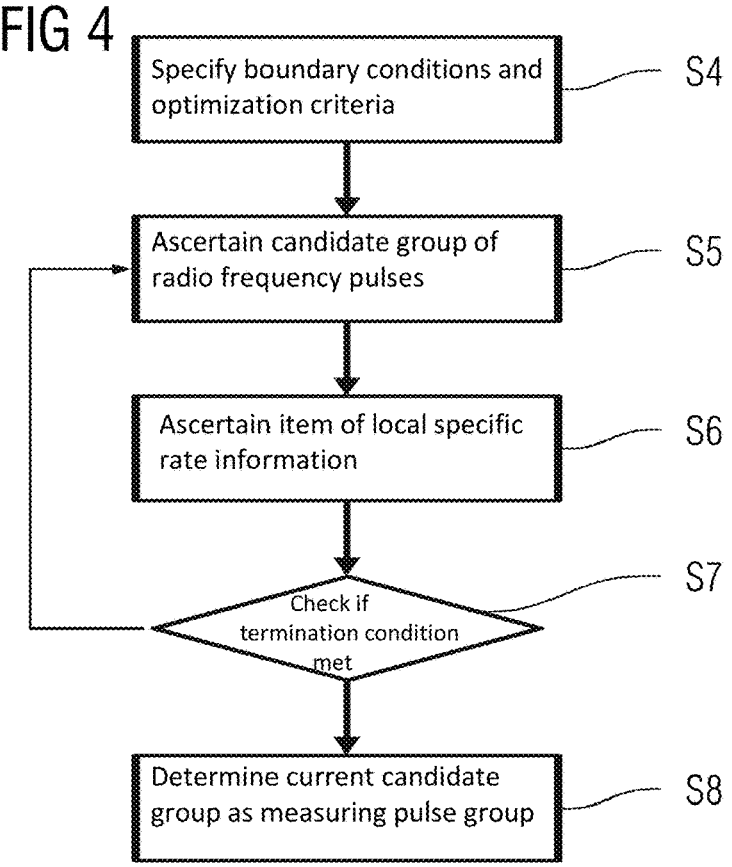
FIG. 4 depicts a flowchart of an embodiment of the pulse design method.

The method described with regard to FIG. 1 may be used in an optimization procedure of a pulse design method, as is explained by way of example by FIG. 4. Boundary conditions and optimization criteria are specified in act S4, with only the boundary condition of not overshooting a certain limit value for the local specific absorption rate being relevant in the present case. Alternatively, or additionally, a minimization of the maximum local specific absorption rate that occurs may be used as the optimization criterion, and this results in an optimum uniform distribution of the energy inputs.

During the course of the optimization procedure that now follows, a candidate group of radio frequency pulses is ascertained in act S5 and evaluated in act S6. An item of local specific absorption rate information ascertained during the course of act S6 in accordance with acts S1 to S3 also contributes to this evaluation. On the basis of this, it is then possible to check whether the boundary condition with respect to the local specific absorption rate is being adhered to and/or whether an improvement has occurred in relation to the optimization goal.

In act S7, it is then checked whether a termination condition is met for the optimization. If this is not the case, the candidate group is adjusted in act S5 and iteration occurs again, with the results of the evaluation in act S6 also being included in the adjustment.

With respect to an improvement of the SAR properties, utilization is made of the fact that, owing to the use of the parallel transmission technique for at least one of the nuclides, it is possible to adjust the SAR pattern, in particular to shift hotspots. If, for example, only a single logical coil channel is used for a different nuclide, the at least one corresponding hotspot is unchangeable therefore, during the course of the optimization described here the hotspots of the nuclides, for which the parallel transmission technique is used, may be shifted away from the positions thereof, in particular in such a way that the maximum energy input budget is available at the at least one first position of the at least one unchangeable hotspot, and this allows more varied design options and boundary conditions to be adhered to better. The performance of the magnetic resonance facility in respect of such magnetic resonance measurements is thus improved as a whole.

Once the optimization procedure in act S7 has been identified as concluded, the current candidate group is determined in act S8 as the measuring pulse group and may be output for the magnetic resonance measurement by a sequence unit of the control facility of the magnetic resonance facility.

Figure 5:
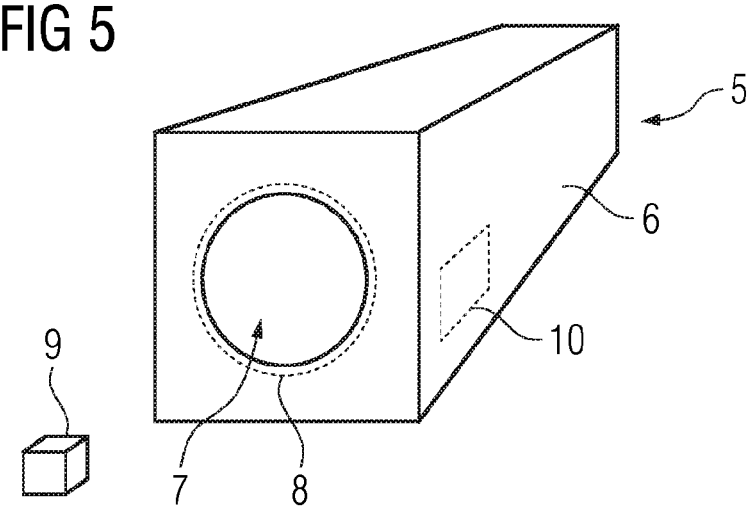
FIG. 5 depicts a schematic diagram of an example of magnetic resonance facility.

FIG. 5 shows a schematic diagram of an imaging magnetic resonance facility 5. The magnetic resonance facility 5 has a main magnet unit 6 with the main magnet generating the main magnetic field, which unit defines a patient receiver 7 into which a patient may be drawn by a patient couch (not shown here). The magnetic field strength of the main magnet field is 7 T or more.

Figure 6:
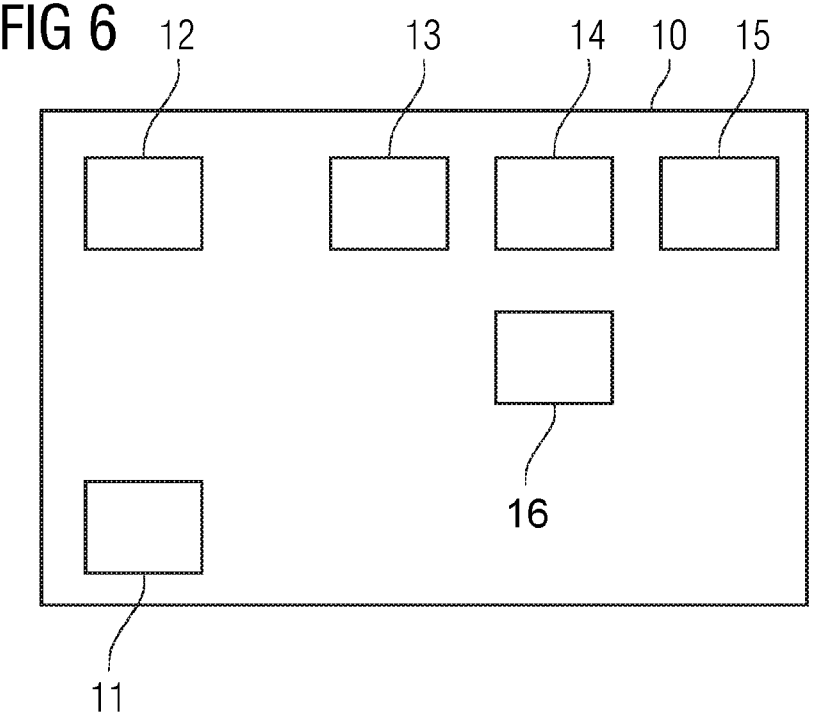
FIG. 6 depicts an example of a functional construction of a control facility of the magnetic resonance facility.

A gradient coil arrangement (not shown here) and a first radio frequency coil arrangement 8, embodied as a body coil, are provided so as to surround the patient receiver 7. A further possible embodiment of a second radio frequency coil arrangement 9 is shown as a local coil arrangement. Operation of the magnetic resonance facility 5 is controlled by a control facility 10, which is embodied for carrying out the method and whose specific functional structure is shown in more detail in FIG. 6.

Accordingly, the control facility 10 includes a storage facility 11 in which, for example, actuation variables, items of field information and the like may be stored. Furthermore, it includes a sequence unit 12 that controls the recording operation of the magnetic resonance facility 5, for example also by way of the output of measuring pulse group of radio frequency pulses, as was determined in act S8.

The simulation according to act S1 may take place in a simulation unit 13. The computing matrix 1, 1' is ascertained in accordance with act S2 in a parameterization unit 14. An ascertainment unit 15 serves to ascertain the item of local specific absorption rate information in accordance with act S3 using the ascertainment algorithm.

The control facility 10 may also have an optimization unit 16 for carrying out the optimization procedure, cf., acts S5, S6, and S7, described in FIG. 4. The specifications may be provided in accordance with act S4, and the designed radio frequency pulses of the measuring pulse group may be output in accordance with act S8 via internal interfaces (not shown).

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for ascertaining an item of local specific absorption rate information in an object under an effect of specified radio frequency pulses of a candidate group, which are output with a radio frequency coil arrangement of a magnetic resonance facility, wherein the radio frequency pulses are configured to manipulate nuclear spins of at least two different nuclides, wherein the radio frequency pulses implement a parallel transmission technique for at least one nuclide of the at least two different nuclides, and wherein the radio frequency pulses are generated by controlling the radio frequency coil arrangement according to actuation variables assigned to the candidate group, the method comprising:

ascertaining the item of local specific absorption rate information by an ascertainment algorithm that uses the actuation variables as input data, wherein the ascertainment algorithm is parameterized by taking into account the at least two different nuclides and respectively assigned logical coil channels thereof in such a way that the item of local specific absorption rate information is jointly ascertained for all nuclides with a same local location reference.

2. The method of claim 1, wherein, for parameterization of the ascertainment algorithm, a simulation for ascertaining items of field information that describes a generated electrical field for each subvolume of a plurality of subvolumes of the object under standard conditions defined in respect of the actuation variables is carried out for all logical coil channels used for outputting the radio frequency pulses to which channels one actuation variable is assigned respectively, wherein, for each subvolume of the plurality of subvolumes, a computing matrix of the ascertainment algorithm is ascertained from the items of field information, which matrix connects the actuation variables to a local specific absorption rate and is dimensioned to cover all logical coil channels, and wherein matrix elements, which link logical coil channels assigned to different nuclides, are set at zero.

3. The method of claim 2, wherein the ascertainment algorithm comprises a compression method in which clusters, which comprise a plurality of subvolumes, are jointly represented.

4. The method of claim 3, wherein the plurality of subvolumes are jointly represented by one subvolume of the plurality of subvolumes.

5. The method of claim 3, wherein the compression method comprises using a virtual observation point.

6. The method of claim 3, wherein, for the at least one nuclide of the at least two different nuclides, only one logical coil channel is used and/or logical coil channels used for different nuclides use a shared physical coil channel.

7. The method of claim 1, wherein the ascertainment algorithm comprises a compression method in which clusters, which comprise a plurality of subvolumes, are jointly represented.

8. The method of claim 7, wherein the plurality of subvolumes are jointly represented by one subvolume of the plurality of subvolumes.

9. The method of claim 7, wherein the compression method comprises using a virtual observation point.

10. The method of claim 1, wherein, for the at least one nuclide of the at least two different nuclides, only one logical coil channel is used and/or logical coil channels used for different nuclides use a shared physical coil channel.

11. A method for ascertaining a measuring pulse group of radio frequency pulses for use in a magnetic resonance measurement with a magnetic resonance facility, the method comprising:

ascertaining, in an optimization procedure, the measuring pulse group for adhering to a boundary condition that limits a local specific absorption rate and/or for minimizing a maximum local specific absorption rate that occurs; and ascertaining an item of local specific absorption rate information in an object under an effect for candidate groups of radio frequency pulses, which are evaluated in the optimization procedure, wherein the radio frequency pulses are configured to manipulate nuclear spins of at least two different nuclides, wherein the radio frequency pulses implement a parallel transmission technique for at least one nuclide of the at least two different nuclides, wherein the radio frequency pulses are generated by controlling a radio frequency coil arrangement according to actuation variables assigned to the candidate group, wherein the boundary condition is adhered to and/or minimization takes place by using the ascertained item of local specific absorption rate information, wherein the item of local specific absorption rate information is ascertained by an ascertainment algorithm that uses the actuation variables as input data, and wherein the ascertainment algorithm is parameterized by taking into account the at least two different nuclides and respectively assigned logical coil channels thereof in such a way that the item of local specific absorption rate information is jointly ascertained for all nuclides with a same local location reference.

12. The method of claim 11, wherein, during a course of the optimization procedure, when a hotspot exists for at least one first nuclide of the at least two different nuclides, to which only one logical coil channel is assigned, at least one hotspot of at least one second nuclide of the at least two different nuclides, to which a plurality of logical coil channels is assigned for implementing the parallel transmission technique, is removed from the hotspot for the at least one first nuclide.

13. The method of claim 12, wherein, during a course of minimization, a uniform distribution of energy input into subvolumes of the object is sought, and wherein use of a plurality of coil channels for the at least one nuclide of the at least two different nuclides is utilized for adjusting a distribution of hotspots for the at least one nuclide.

14. The method of claim 11, wherein, during a course of minimization, a uniform distribution of energy input into subvolumes of the object is sought, and wherein use of a plurality of coil channels for the at least one nuclide of the at least two different nuclides is utilized for adjusting a distribution of hotspots for the at least one nuclide.

15. A magnetic resonance facility comprising:

a radio frequency coil arrangement having a plurality of coil elements actuated via different physical coil channels and configured for imaging with manipulation of a plurality of nuclides; and a control facility configured to ascertain an item of local specific absorption rate information by an ascertainment algorithm that uses actuation variables as input data, wherein the ascertainment algorithm is parameterized by taking into account the plurality of nuclides and respectively assigned logical coil channels thereof in such a way that the item of local specific absorption rate information is jointly ascertained for all nuclides with a same local location reference, wherein radio frequency pulses are configured to manipulate nuclear spins of at least two different nuclides, wherein the radio frequency pulses implement a parallel transmission technique for at least one nuclide of the at least two different nuclides, and wherein the radio frequency pulses are generated by controlling the radio frequency coil arrangement according to actuation variables assigned to a candidate group.

* * * * *